(12) United States Patent
Cromelon

(10) Patent No.: X6826
(45) Date of Patent: Nov. 7, 1831

(54) MATTRESSES,SOFAS, &C.

(76) Inventor: Rowland Cromelon

Rowland Crommelin, of New York
Letters Patent

The Schedule referred to in these Letters Patent, and making part of the same, containing a description in the words of the said Rowland Crommelin himself of his Improvement in the mode of manufacturing Matresses, Sofas, and other articles. —

To all whom it may concern,

Be it Known that I, Rowland Crommelin, of the City of New York, have invented an improvement in the mode of Manufacturing Matresses, Sofas, and other articles requiring an elastic stuffing, and that the following is a full and exact description of my said invention. —

Although the plan of making Matresses adopted by me is applicable to a variety of other articles, these various applications will be readily understood by every workman, from a single example, I shall therefore confine my description to the mode of procedure in manufacturing the one first named. —

The foundation of my Matress is a framework of wood and usually of white pine which is preferred on account of its lightness.

When the matress is not intended to fold up, I first take two lattice work frame, which may be made of stuff cut into strips about three inches wide, and from three fourths of an inch to one inch in thickness.

Four of these strips form the outside of each frame, which is to be of the size of the matress to be made. Other strips are framed across either to form oblong squares, like the rails of a window sash, or any other shape which may be preferred. These strips are halved together where they cross each other, and are securely fastened, so as to render the frame sufficiently strong, without being heavy.

Between the two frames thus prepared, I insert springs made of iron or steel wire. These springs are made in a spiral form, and they are generally wound so that their out line is that of two cones jointed together at their apices, they however may be wound in other forms and still produce the same effect. The springs are firmly fixed at each end to the frames before mentioned, thus uniting them by a medium possessing great elasticity. The number of these springs will depend upon the size of the matress and that of the wire used, in matresses of the larger size, from thirty to forty will be found sufficient. The wire which I generally use is from number eight to number ten; and the length of the spring when wound may vary from eight inches to twenty. I usually fasten them to the frames by means of wire staples.

In many instances great advantage has been derived by invalids from sleeping upon an inclined plane, instead of the usual horizontal position, and attempts have been made, but not successfully to give a regular inclination from the head to the foot to matresses made in the common way; but upon my principle this is readily and perfectly effected, all that is necessary being to vary the height of the springs regularly in proceeding from the head to the foot.

After the springs have been fixed in their places, that frame which is intended to form the upper side of the matress is to have strong canvass, or other cloth, stretched over it and secured by nailing at the edges of the frame: this cloth is also to be carried down and tacked to the bottom frame so as to form the sides and ends of the matress, and to bring the two frames to a proper distance from each other. Upon the top of this canvass, curled hair is to be spread evenly, from ten to fifteen pounds being sufficient for a large matress. The ticken, properly prepared, is then laid over the hair, is tacked at the edges of each frame and bound in the usual manner. It is then quilted down & tufted on the upper side. To prevent any improper longitudinal or lateral motion of the frames, I employ small iron, or other wire to brace them. The pieces of wire so used are cut to a convenient length, say two or three feet, one end of each is fastened to the upper, and one to the lower frame, passing diagonally, and in reversed directions from eight to a dozen being used.

When the matress is to be doubled up, so as to be portable, each of the frames, before described, may be divided into two parts; and the upper frame hinged together, with two, three, or more hinges, according to its size it may be then [illegible], so as to bring the two ends of the matress, nearly into contact. To the under frame latches or bolts properly constructed, are to be affixed, for securing the divided frames together, when in use. –

I do not claim the application of springs, such as I have described so as to produce elasticity in the matresses, sofas, and other articles, these having been before so employed; but I claim as my invention, the attaching them to frames of wood, for the purposes, and in the manner hereinbefore set forth. I also claim the use of the diagonal braces, whether made of wire or other material. –

Witnesses.
Robt. Clark.
Joseph Cross.

1150

Rd. [illegible]

[illegible]